US009672417B2

(12) United States Patent
Wooley et al.

(10) Patent No.: US 9,672,417 B2
(45) Date of Patent: Jun. 6, 2017

(54) SCALE INDEPENDENT TRACKING PATTERN

(71) Applicant: LUCASFILM ENTERTAINMENT COMPANY LTD., San Francisco, CA (US)

(72) Inventors: Kevin Wooley, San Francisco, CA (US); Ronald Mallet, Mill Valley, CA (US)

(73) Assignee: LUCASFILM ENTERTAINMENT COMPANY, LTD., San Francisco, CA (US)

( * ) Notice: Subject to any disclaimer, the term of this patent is extended or adjusted under 35 U.S.C. 154(b) by 0 days.

(21) Appl. No.: 14/986,274

(22) Filed: Dec. 31, 2015

(65) Prior Publication Data

US 2016/0110594 A1     Apr. 21, 2016

Related U.S. Application Data

(62) Division of application No. 14/571,014, filed on Dec. 15, 2014, now Pat. No. 9,256,778, which is a division
(Continued)

(51) Int. Cl.
*G06K 9/00* (2006.01)
*G06F 3/01* (2006.01)
(Continued)

(52) U.S. Cl.
CPC ........ *G06K 9/00342* (2013.01); *G01B 11/254* (2013.01); *G06F 3/011* (2013.01); *G06K 9/00624* (2013.01); *G06T 7/246* (2017.01); *G06T 7/60* (2013.01); *H04N 5/232* (2013.01); *G06T 2207/10016* (2013.01);
(Continued)

(58) Field of Classification Search
CPC combination set(s) only.
See application file for complete search history.

(56) References Cited

U.S. PATENT DOCUMENTS 5,790,124 A * 8/1998 Fischer .................. G06T 15/10
345/473
5,831,260 A    11/1998 Hansen
(Continued)

FOREIGN PATENT DOCUMENTS

EP    1946243 A2    7/2008
EP    2018825 A1    1/2009
(Continued)

OTHER PUBLICATIONS

AU2012282981, "Examination Report", Mar. 26, 2015, 3 pages.
Bian, et al., "Development of a Tracking Method for Augmented Reality Applied to NPP Maintenance Work and Its Experimental Evaluation", ACM Symposium on Virtual Reality Software & Technology, Nov. 1-3, 2006, pp. 35-44.
Blackledge, et al., "A Surface Inspection Machine Vision System that Includes Fractal Texture Analysis", ISAST Transactions on Electronics and Signal Processing, http://eleceng.dit.ie/papers/112.pdf, Dec. 20, 2010, 14 pages.
CA2,841,550, "Office Action", Apr. 16, 2015, 4 pages.
(Continued)

*Primary Examiner* — Anand Bhatnagar
(74) *Attorney, Agent, or Firm* — Kilpatrick Townsend & Stockton LLP

(57) ABSTRACT

In one aspect, a computer implemented method of motion capture, the method includes tracking the motion of a dynamic object bearing a pattern configured such that a first portion of the patterns is tracked at a first resolution and a second portion of the pattern is tracked at a second resolution. The method further includes causing data representing the motion to be stored to a computer readable medium.

18 Claims, 7 Drawing Sheets

Related U.S. Application Data of application No. 13/181,342, filed on Jul. 12, 2011, now Pat. No. 8,948,447.

(51) Int. Cl.
   *G01B 11/25* (2006.01)
   *H04N 5/232* (2006.01)
   *G06T 7/60* (2017.01)
   *G06T 7/246* (2017.01)

(52) U.S. Cl.
   CPC ........... *G06T 2207/30196* (2013.01); *G06T 2207/30204* (2013.01); *G06T 2207/30208* (2013.01); *G06T 2207/30241* (2013.01)

(56) References Cited

U.S. PATENT DOCUMENTS

| | | | |
|---|---|---|---|
| 5,932,417 A | 8/1999 | Birnbaumer et al. | |
| 6,072,496 A | 6/2000 | Guenter et al. | |
| 6,115,052 A | 9/2000 | Freeman et al. | |
| 6,166,811 A | 12/2000 | Long et al. | |
| 6,208,348 B1 | 3/2001 | Kaye | |
| 6,324,296 B1 | 11/2001 | McSheery et al. | |
| 6,353,422 B1 | 3/2002 | Perlman et al. | |
| 6,438,255 B1 | 8/2002 | Lesniak et al. | |
| 6,515,659 B1 | 2/2003 | Kaye et al. | |
| 6,522,332 B1 | 2/2003 | Lanciault et al. | |
| 6,614,407 B2 | 9/2003 | Perlman et al. | |
| 6,686,926 B1 | 2/2004 | Kaye | |
| 6,847,740 B1 | 1/2005 | Birkle et al. | |
| 6,919,892 B1 | 7/2005 | Cheiky et al. | |
| 6,977,630 B1 | 12/2005 | Donath et al. | |
| 7,102,633 B2 | 9/2006 | Kaye et al. | |
| 7,116,323 B2 | 10/2006 | Kaye et al. | |
| 7,116,324 B2 | 10/2006 | Kaye et al. | |
| 7,164,718 B2 | 1/2007 | Maziere et al. | |
| 7,212,656 B2 | 5/2007 | Jacobs et al. | |
| 7,457,438 B2* | 11/2008 | Nair ................ | H04N 5/145 348/143 |
| 8,096,885 B2* | 1/2012 | MacDonald ........ | F16F 15/123 29/446 |
| 8,098,885 B2 | 1/2012 | Zhang et al. | |
| 8,374,397 B2* | 2/2013 | Shpunt .............. | G01B 11/25 345/419 |
| 8,433,101 B2* | 4/2013 | Xu .................. | G06K 9/00335 345/156 |
| 8,532,340 B2* | 9/2013 | Kruglick ............ | G06K 9/2036 356/605 |
| 8,532,368 B2* | 9/2013 | Se .................... | G01C 11/06 382/154 |
| 8,720,790 B2* | 5/2014 | Hanina .............. | G06K 9/527 235/494 |
| 8,786,680 B2* | 7/2014 | Shiratori ............ | G06F 3/011 345/156 |
| 8,948,447 B2 | 2/2015 | Wooley et al. | |
| 2001/0024512 A1 | 9/2001 | Yoronka et al. | |
| 2001/0033675 A1 | 10/2001 | Maurer et al. | |
| 2002/0041285 A1 | 4/2002 | Hunter et al. | |
| 2002/0060649 A1 | 5/2002 | Perlman et al. | |
| 2003/0108220 A1* | 6/2003 | Jepson .............. | G06K 9/00228 382/103 |
| 2003/0185434 A1* | 10/2003 | Lee .................. | G06F 3/012 382/154 |
| 2004/0063481 A1 | 4/2004 | Wang et al. | |
| 2004/0119716 A1 | 6/2004 | Park et al. | |
| 2004/0155962 A1* | 8/2004 | Marks .............. | G06T 7/2033 348/169 |
| 2004/0161132 A1 | 8/2004 | Cohen et al. | |
| 2004/0179008 A1 | 9/2004 | Gordon et al. | |
| 2005/0078124 A1 | 4/2005 | Liu et al. | |
| 2005/0099414 A1 | 5/2005 | Kaye et al. | |
| 2005/0104878 A1 | 5/2005 | Kaye et al. | |
| 2005/0104879 A1 | 5/2005 | Kaye et al. | |
| 2005/0146521 A1 | 7/2005 | Kaye et al. | |
| 2005/0231505 A1 | 10/2005 | Kaye et al. | |
| 2006/0055699 A1 | 3/2006 | Perlman et al. | |
| 2006/0055706 A1 | 3/2006 | Perlman et al. | |
| 2006/0067573 A1 | 3/2006 | Parr et al. | |
| 2006/0126928 A1 | 6/2006 | Edwards et al. | |
| 2006/0157640 A1 | 7/2006 | Perlman et al. | |
| 2006/0192785 A1 | 8/2006 | Marschner et al. | |
| 2006/0192854 A1 | 8/2006 | Perlman et al. | |
| 2006/0228101 A1 | 10/2006 | Sullivan et al. | |
| 2007/0052711 A1 | 3/2007 | Gordon et al. | |
| 2007/0086653 A1 | 4/2007 | Javidi et al. | |
| 2007/0091178 A1* | 4/2007 | Cotter .............. | G06K 9/3216 348/159 |
| 2007/0098218 A1* | 5/2007 | Zhang .............. | G06K 9/00228 382/103 |
| 2007/0133841 A1 | 6/2007 | Zhang et al. | |
| 2008/0170077 A1 | 7/2008 | Sullivan et al. | |
| 2008/0170078 A1 | 7/2008 | Sullivan et al. | |
| 2008/0170777 A1 | 7/2008 | Sullivan et al. | |
| 2008/0180448 A1 | 7/2008 | Anguelov et al. | |
| 2009/0195545 A1* | 8/2009 | Debevec ........... | G06T 13/40 345/473 |
| 2009/0209343 A1 | 8/2009 | Foxlin et al. | |
| 2010/0002934 A1 | 1/2010 | Sullivan et al. | |
| 2010/0164862 A1 | 7/2010 | Sullivan et al. | |
| 2010/0172542 A1 | 7/2010 | Stein et al. | |
| 2011/0262011 A1* | 10/2011 | Nair ................ | G06T 7/20 382/107 |
| 2015/0199562 A1 | 7/2015 | Wooley et al. | |

FOREIGN PATENT DOCUMENTS

| | | |
|---|---|---|
| JP | 09084691 A | 3/1997 |
| WO | 02054334 A1 | 7/2002 |
| WO | 2004038657 A2 | 5/2004 |
| WO | 2009032944 A2 | 3/2009 |

OTHER PUBLICATIONS

Chang, et al., "Automatic 3D Facial Expression in Analysis in Videos", Proc. IEEE Int'l Workshop Analysis and Modeling of Faces and Gestures (AMFG '05), vol. 3723, 2005, pp. 293-307.

Darby, "Fractal transform network in digital image content analysis", SPIE, vol. 2492, Apr. 6, 1995, pp. 820-825.

Debevec, et al., "Acquiring the Reflectance Field of a Human Face", SIGGRAPH Conference Proceedings 2000, 12 pages.

Deng, et al., "Animating blendshape faces by cross-mapping motion capture data", In Proceedings of the 2006 Symposium on Interactive 3D Graphics and Games, Mar. 14-17, 2006, 7 pages.

EP0718003.7, "Examination Report", Aug. 3, 2009, 2 pages.

Furukawa, et al., "Dense 3D Motion Capture from Synchronized Video Streams", URL:http://www.cs.washington.edu/homes/furukawa/papers/cvpr08b.pdf>, 2009, 8 pages.

GB0922650.7, "Search Report", Apr. 20, 2010, 2 pages.

Grung, et al., "Missing Values in principal component analysis", Chemometrics and Intelligent Laboratory Systems, vol. 42, Elsevier Science B.V., 1998, pp. 125-139.

Heap, et al., "Towards 3D Hand Tracking using a Deformable Model", Proceedings of the 2nd International Conference on Automatic Face and Gesture Recognition IFG '96), IEEE, Oct. 14-16, 1996, pp. 140-145.

Herda, et al., "Skeleton-Based Motion Capture for Robust Reconstruction of Human Motion", Computer Animation 2000. Proceedings, 2000, pp. 77-83.

Horprasert, et al., "Real-time 3D Motion Capture", Second workshop on Perceptual Interfaces, Nov. 1998, 4 pages.

Jacobs, et al., "Image compression: A study of the iterated transform method", Signal Processing vol. 29, No. 3, Dec. 1992, pp. 251-263.

Lin, et al., "Extracting 3D Facial Animation Parameters from Multiview Video Clips", IEEE Computer Graphics and Applications, vol. 22, No. 6; IEEE, pp. 72-80, Nov./Dec. 2002.

Majkowska, et al., "Automatic splicing for hand and body animations", In Proceedings of the 2006 ACM SIGGRAPH/Eurographics symposium on Computer animation, 2006, pp. 309-316 and 369.

(56) References Cited

OTHER PUBLICATIONS

Markoff, "Camera System Creates Sophisticated 3-D Effects", <URL:www.nytimes.com/2006/0731/technology/31motion.html>,, Jul. 31, 2006, 4 pages.
NZ561570, "Examination Report", Dec. 18, 2009, 1 page.
NZ561570, "Examination Report", Jul. 7, 2009, 2 pages.
NZ581496, "Examination Report", Dec. 2, 2009, 2 pages.
NZ582356, "Examination Report", Jan. 7, 2010, 2 pages.
NZ619933, "Examination Report", May 30, 2014, 2 pages.
PCT/US2006/009787, "International Preliminary Report on Patentability", Nov. 13, 2007, 9 pages.
PCT/US2006/009787, "International Search Report and Written Opinion", Oct. 29, 2007, 12 pages.
PCT/US2012/045459, "International Preliminary Report on Patentability", Jan. 14, 2014, 9 pages.
PCT/US2012/045459, "International Search Report and Written Opinion", Nov. 29, 2012, 12 pages.
Salzmann, et al., "Local Models for Monocular Reconstruction of Deformable 3D Surfaces", http://cvlab.epflch/research/surface/deformable, Nov. 15, 2010, 2 pages.
Wren, et al., "Dynamic models of human motion", http://www.driven.com/chris/dyna/TR-415.pdf>, 1998, 6 pages.
NZ724315, "Office Action", Feb. 2, 2017.

* cited by examiner

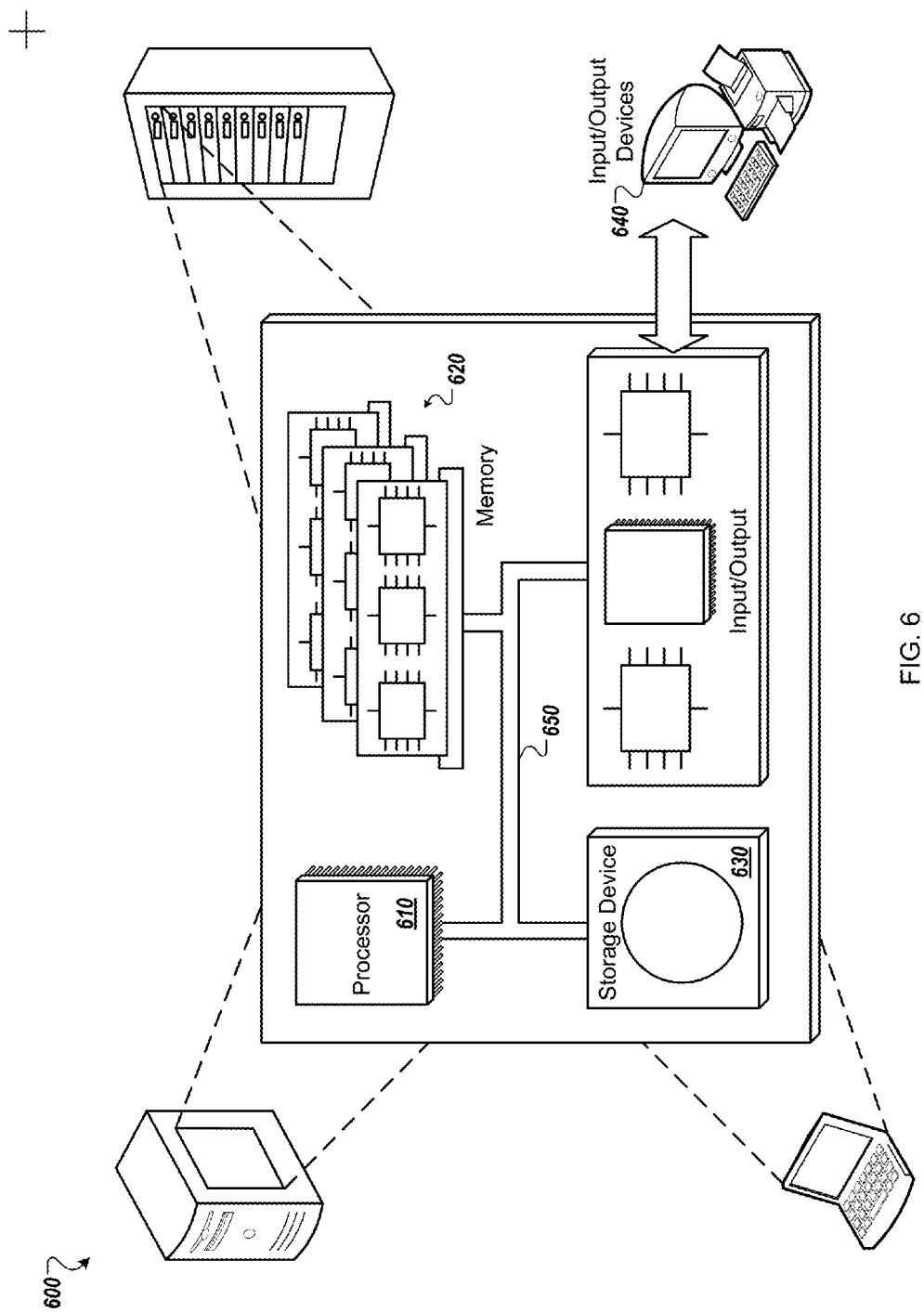

SCALE INDEPENDENT TRACKING PATTERN

CROSS-REFERENCES TO RELATED APPLICATIONS

This application is a division of U.S. patent application Ser. No. 14/571,014, filed Dec. 15, 2014; which is division of U.S. patent application Ser. No. 13/181,342, filed Jul. 12, 2011, now U.S. Pat. No. 8,948,447. The disclosures of each are hereby incorporated by reference.

COPYRIGHT

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

This document relates to computer vision.

BACKGROUND OF THE INVENTION

Motion capture is an approach to generating motion data that is based on tracking and recording the movement of real objects. One common application of motion capture is in animation where a realistic sequence of motion, e.g., by a human actor, can be captured and used to represent the motion of an animated object.

In some motion capture systems, an actor wears a black bodysuit. A number of white balls are attached to the suit at the actor's joints, e.g., shoulder, elbow, wrist. The actor then performs a sequence of movements which is digitally recorded by a number of cameras. The recorded data is then processed by a motion capture program.

The motion capture program recognizes the white balls as points. If multiple cameras record the same point in a respective frame and the locations of the cameras are known, the motion capture program can determine the 3D position of the point using triangulation. The motion capture system may determine 3D positions for all of the points in each of the frames.

BRIEF SUMMARY OF THE INVENTION

In one aspect, a computer implemented method of motion capture includes tracking the motion of a dynamic object bearing a pattern configured such that a first portion of the patterns is tracked at a first resolution and a second portion of the pattern is tracked at a second resolution. The method further includes causing data representing the motion to be stored to a computer readable medium.

Implementations can include any, all, or none of the following features. The dynamic object is a human actor. The first resolution is associated with the object at a first distance from a camera and the second resolution is associated with the object at a second distance from the camera; and wherein the method further includes tracking the motion of the dynamic object as the dynamic objects distance from the camera changes from the first distance to the second distance. A first section of the pattern has a first property and a second section of the pattern has a second property; and wherein the method further includes identifying an occlusion of the first section of the dynamic object by a second section of the dynamic object by identifying the second property. The first portion includes first properties and the second portion includes second properties, the first properties being different than the second properties; and wherein the method further includes determining a distance of the dynamic object from a camera using a resolution of the first properties as they are recorded by the camera.

In one aspect, motion capture equipment includes a bodysuit; and on at least part of an outside of the bodysuit, a pattern for exposure to a motion capture system that is configured to detect a at least a first feature and a second feature. The pattern has at least first and second portions, the first portion corresponding to the first feature at a first resolution of the motion capture system and the second portion corresponding to the second feature at a second resolution of the motion capture system.

Implementations can include any, all, or none of the following features. At least a portion of the pattern is trackable at any resolution between the first resolution and the second resolution. The pattern is a fractal. The pattern is pseudo-random noise. A first section of the pattern has a first property and a second section of the pattern has a second property and wherein an occlusion of the first section by the second section is identifiable by identifying the second property. The first feature includes first shapes and the second feature includes second shapes, the first shapes being different than the second shapes. The first feature comprises first shapes and the second feature comprises the first shapes.

In one aspect, a computer implemented method of machine vision includes identifying a first portion of a scale independent pattern at a first resolution. The method further includes identifying a second portion of the scale independent pattern at a second resolution. The second portion of the scale independent pattern cannot be identified at the first resolution. The method further includes causing data related to the identifying to be stored to a computer readable medium.

Implementations can include any, all, or none of the following features. The method further includes identifying the pattern at a plurality of resolutions between first resolution and the second resolution. The scale independent pattern is a fractal. The scale independent pattern is pseudo-random noise. The machine vision process is motion capture. The machine vision process is navigation waypoint tracking.

In one aspect, a computer implemented method of machine vision includes identifying a first portion of a scale independent pattern at a first lens focus value. The method further includes identifying a second portion of the scale independent pattern at a second lens focus value. The method further includes causing data related to the identifying to be stored to a computer readable medium.

In one aspect, a computer implemented method of machine vision includes identifying a first portion of a scale independent pattern without motion blur. The method further includes identifying a second portion of the scale independent pattern with motion blur. The method further includes causing data related to the identifying to be stored to a computer readable medium.

In one aspect, a computer readable medium storing instructions that, when executed by one or more processing devices, cause the one or more processing devices to perform operations includes detecting at least a first feature and a second feature of a pattern on the computer readable medium, the pattern having at least first and second portions, the first portion corresponding to the first feature at a first resolution of the motion capture system and the second portion corresponding to the second feature at a second resolution of the motion capture system.

Various implementations of the subject matter described here may provide one or more of the following advantages. In some implementations, use of a pattern that is trackable over a range of resolutions can enable motion capture filming over a wide range of camera-target distances, resolutions, focus values, and motion blurs. In some implementations, use of a pattern that is trackable over a range of resolutions can enable direction of a motion picture scene with more flexibility of camera and actor placement and filming parameters. In some implementations, use of a pattern that is trackable over a range of resolutions can enable tracking of an object while the camera or object moves. In some implementations, use of a pattern that is trackable over a range of resolutions can enable tracking of navigational waypoints by a camera system affixed to a moving object.

The details of one or more implementations are set forth in the accompanying drawings and the description below. Other features and advantages will be apparent from the description and drawings, and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 is a schematic diagram that shows an example of a computing system that can be used in connection with computer-implemented methods and systems described in this document.

Like reference symbols in the various drawings indicate like elements.

DETAILED DESCRIPTION OF THE INVENTION

This document describes systems and techniques in which a pattern is imposed on a target for tracking the target by a computer vision technique. The pattern is trackable over a range of resolutions, and may be described as 'scale-independent.' The target can be tracked at a range of distances from capture devices. Additionally, the target can be tracked if it is recorded at a range of image resolutions, image focuses and with motion blurs. The pattern may take the form of makeup, a bodysuit, bands, or other articles worn by the target. Because the pattern is designed for several scales, at least some portions of the pattern can remain trackable across a relatively broad range of distances between a camera and the actor.

Figure 1:
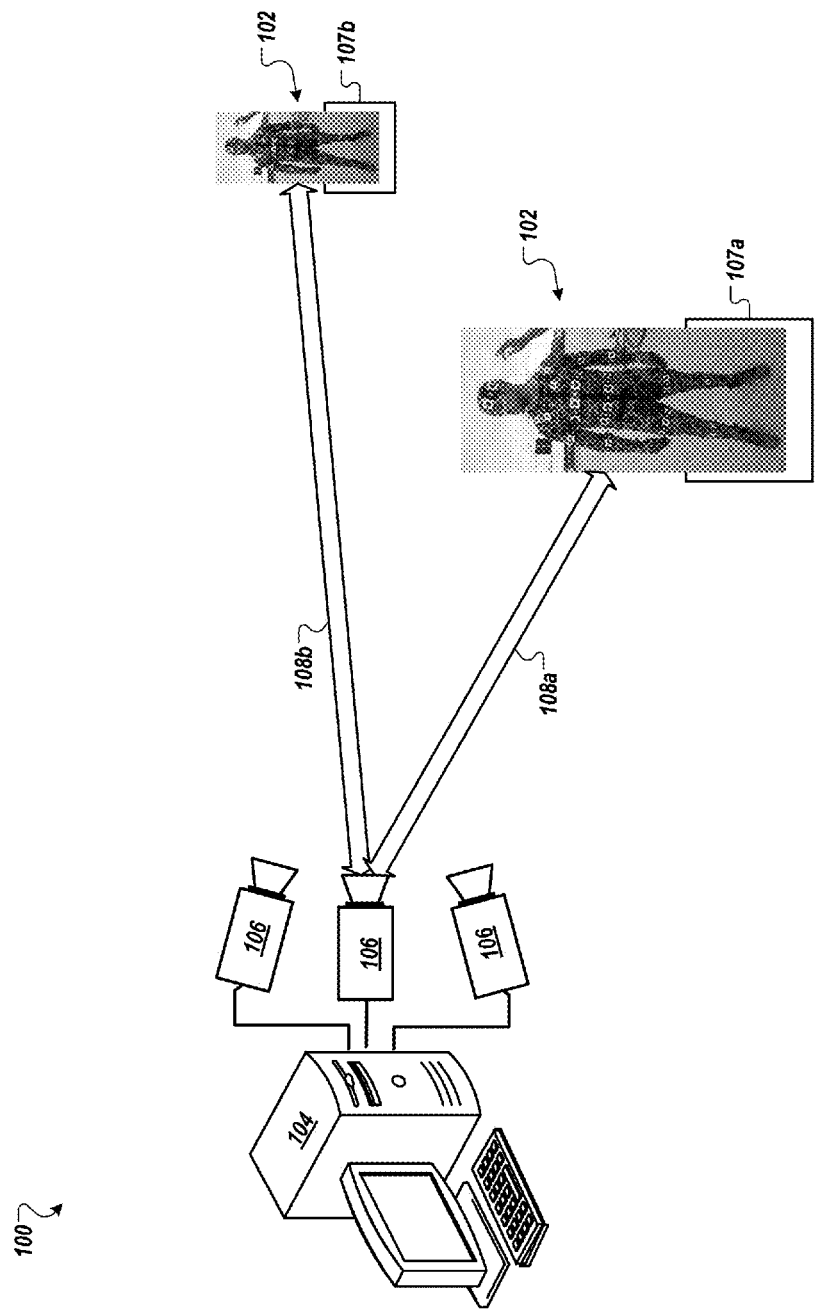
FIG. 1 is a schematic diagram of an example motion capture system.

FIG. 1 is a schematic diagram of an example motion capture system 100. In the system 100, an object, such as an actor 102 may bear a pattern that is trackable by a capture device 104 at a range of resolutions. The marks may be applied in one or more ways. For example, and without limitation, one or more marks can be located on a bodysuit, tattoo, makeup, tracking bands, or other device worn by the actor 102. The marks can create a pattern that is trackable at a range of resolutions may be referred to as 'scale-independent', or 'scale-invariant'. Such patterns may be fractals, random noise, self-similar, self-same, or self-affine. The actor 102 shown here is a human actor, but other types of objects may be tracked by the capture device 102. For example, animals, robots, or stationary objects may be tracked, possibly by moving cameras.

The capture device 102 can collect motion information. For example, data may be collected that represents the movements or surface shape of the actor 102 as the actor moves.

Cameras 106 can be used to capture images (e.g., from different perspectives) of the actor's 102 body or face and provide data that represents the imagery to the capture device 104. Shown here are three cameras 106 for recording the actor 102, but it will be understood that more or fewer cameras 106 are possible.

The actor 102 may move in the field of view of the cameras 106, including moving toward or away from the cameras 106. At position 107a, the actor is a distance 108a, and when the actor moves to a position 107b, the actor is at a greater distance 108b.

When the actor changes positions, the captured size of the actor changes in the view-plane of the images recorded by the cameras 106, and this is here conceptually illustrated by different-size photos of the actor. The resolution of the actor 102 and the pattern changes with this size and, thus, distance. When at position 107a, the actor 102 and pattern are recorded at a higher resolution then the actor is at position 107b. As such, the actor 102, and the pattern born by the actor, will appear to be larger at position 107a than at position 107b.

Other factors can affect the resolution or captured resolution at which the actor 102 is recorded. In one example, the focal length of the cameras 106 may change and change the resolution at which the actor 102 and pattern are recorded. In another example, the actor may move at a speed that introduces motion blur, which can reduce the effective resolution of the actor 102 and pattern.

Provided with the captured imagery, the capture device 104 can calculate the position of portions of the pattern on the actor 102. The portions tracked can include discrete shapes within the pattern. The positions may be used, for example, as vertices to create a mesh or cage representation of the actor 102 as the actor 102 moves in the video. Over the capture time period, as the positions of the portions of the pattern change with the actor's performance, the positions of the vertices of the mesh change.

As the resolution of the actor 102 and the pattern changes, some trackable portions of pattern may become untrackable by the capture device 104, and some untrackable portions of the pattern may become trackable. When this happens, vertices may be added or removed from the mesh. In some implementations, exiting mesh vertices associated with a portion that becomes untraceable may merge with a nearby vertex, be given position values based on interpolations of surrounding vertices, or handled in other ways.

Figure 2:
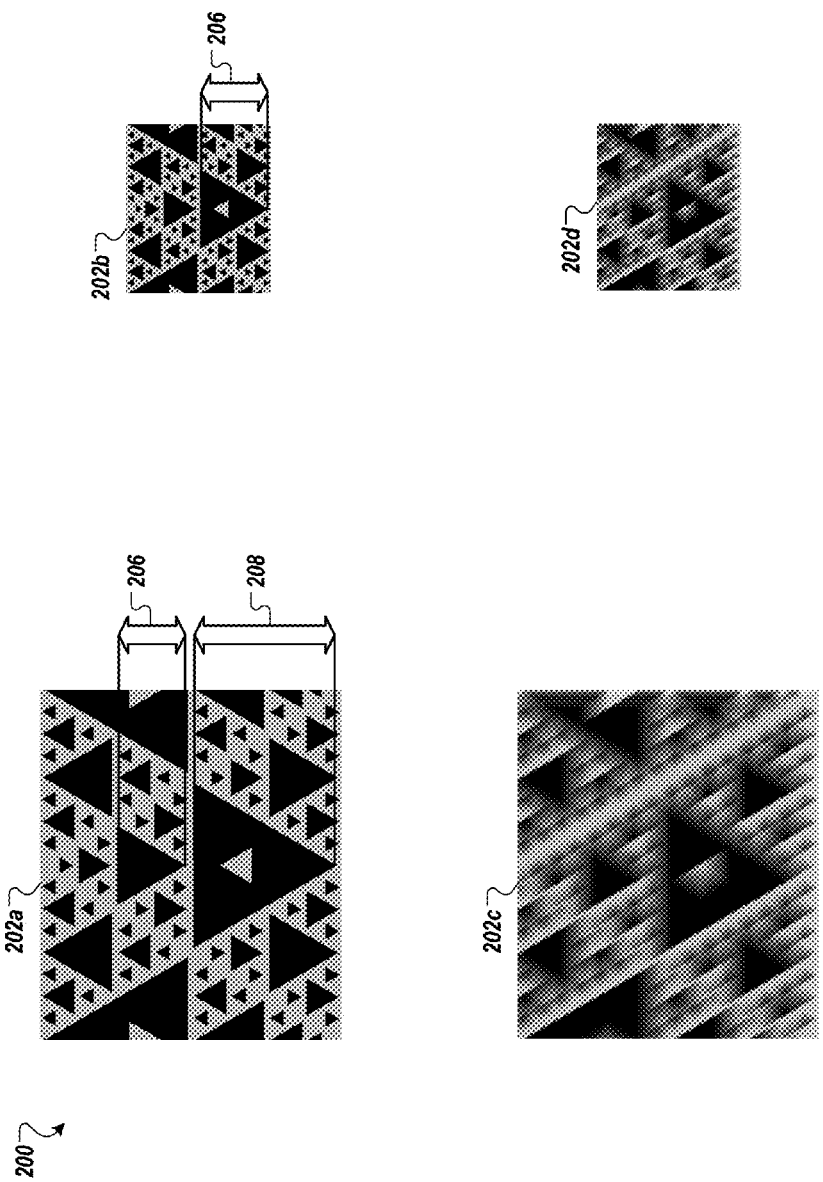
FIG. 2 shows an example scale independent pattern at different resolutions.

FIG. 2 shows an example scale independent pattern 200 at different resolutions. The pattern 200 is a modified version of a Sierpinski triangle fractal pattern where each black triangle has been scaled down in size and gaps of the gray background can be seen between each triangle. The pattern 200 may be placed on the surface of an object, including the actor 102.

The pattern 200 is here shown at a higher resolution 202a and also at a lower resolution 202b. When viewed at the higher resolution 202a, the second order of triangles (the triangles with the second largest size) have a height 206. Similarly, the first order triangles (the triangles with the largest size) have a height 208. When viewed at a lower resolution 202b, with the size reduced due to the difference in resolution with 202a, the first order triangles (the triangles with the largest size) have the same height 206 as the second order of triangles have at the higher resolution 202a.

That is, one more triangles of the height 206 can be observed at both the high resolution 202a and at the low resolution 202b, although it is not the same triangle. If, for example, a vision tracking system is configured to track triangles of a height around the height 206, that vision tracking system would be able to track triangles of the pattern 200 at the resolution 202a and at the resolution 202b. That is, the vision tracking system would be able to recognize the triangle pattern at each of these resolutions, in contrast to, say, a different triangle pattern that is not scale invariant, which the vision tracking system may be unable to recognize at one or more resolutions.

If the vision tracking system is configured to track triangles of a height from the height 208 to the height 206, the vision tracking system would be able to track the first order triangles at any resolution between the resolution 202a and 202b. For example, the pattern on an actor 102 may transition from the resolution 202a to 202b as the actor 102 moves away from the cameras 106 or as the focal length of the cameras 106 change.

The pattern at blurred resolution 202c has been subject to a motion blur or focal blur. For example, the actor 102 may move quickly enough that the at least a portion of the actor and pattern appear with motion blur in one or more frames of the video captured by the cameras 106.

At the blurred resolution 202c, the triangles of the pattern appear indistinct, and the pattern may be compressed to resolution 202d to permit a vision tracking system to identify triangles within the pattern.

Other patterns than the one shown in FIG. 2 are possible. In some implementations, a pattern may consist of a collection of circles of different sizes. Some "off the shelf" or commodity vision tracking software may be configured to track circle shapes, and the use of a scale-independent pattern made of circles may require few or no modifications to the commodity vision tracking software. Additionally, circular shapes may be easier to track than other shapes when blurred.

In some implementations, a pattern may include different shapes, optionally with each shape at a different scale. For example, the pattern 200 may be modified by replacing the triangles of a particular size with circles or another shape. These different shapes may be used by tracking software to, for example, calculate the distance of a pattern bearing object from a camera. For example, the distance between the centers of the two closest circles can be measured or the diameter of a single circle can measured and used to determine the resolution of the pattern. From the resolution, the distance from the camera can be calculated.

In some implementations, a feature of the pattern can vary over the area of the pattern. For example, a bodysuit bearing a pattern can have a torso section that has shapes of a first color or shape, and each leg and arm may have a different color or shape against the same background.

A vision tracking system may use this difference to track an object bearing the pattern. For example, if a bodysuit arm bearing a pattern in red and grey occludes a portion of the bodysuit torso bearing the same pattern in black and grey, the tracking system can efficiently identify which portions of the pattern are associated with the arm and which are associated with the torso.

Some patterns may be regular, and some patterns may be irregular. For example, a regular pattern such as a fractal or self-same pattern may be used. Such patterns may be generated efficiently using image manipulation software, and an object bearing such a pattern (e.g. a bodysuit) may be easily manufactured. For example, a bolt of fabric may be printed with a self-same pattern, and a bodysuit may be created from the bolt of fabric. Irregular patterns may be created by hand or by an automated process. For example, a makeup artist may use stamps of varying sizes or makeup tools to apply a pattern of shapes to an actor, with more of the shape around areas of interest (e.g., eyes and mouth on the face, major joints on the body). In another example, a random or pseudo-random noise pattern of shapes may be applied to an object for tracking.

Figure 3A:
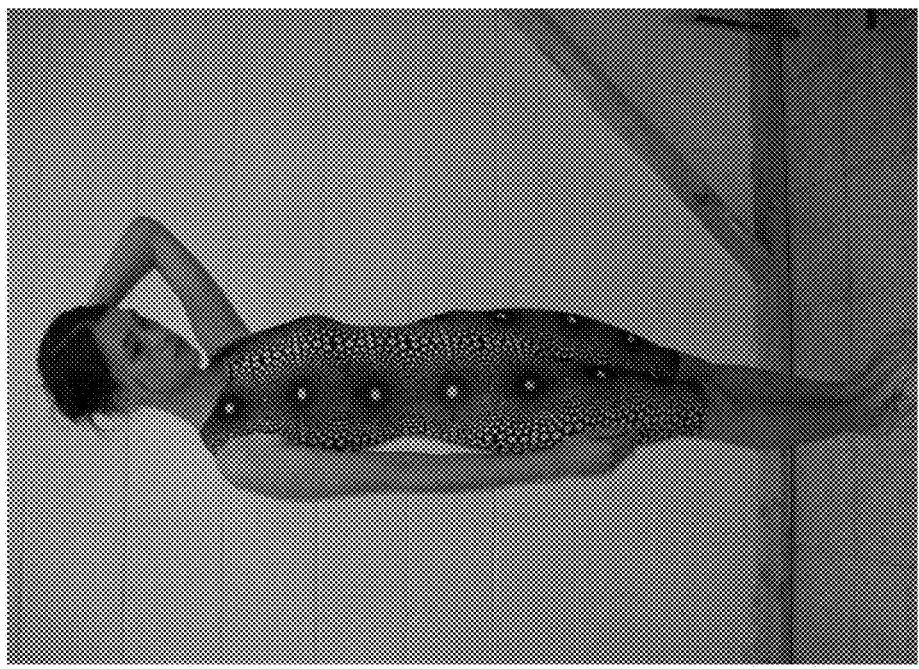
FIG. 3A shows an example motion capture bodysuit with a scale independent pattern.

FIG. 3A shows an example motion capture bodysuit 300 with a scale independent pattern. The bodysuit 300 may be worn by, for example, a performance actor being motion tracked to generate motion data used for animation. In this example, the bodysuit covers only a portion of the actor's body. Such a body suit may be used, for example, when those portions of the actor's body are to be replaced in a motion picture with a computer generated animation and the other portions of the actor's body are to be shown in the motion picture.

The body suit 300 can be manufactured from a variety of materials including, but not limited to, spandex, cotton, or nylon. The materials may be cut and formed into the bodysuit shape, for example by sewing pieces or heat-fusing. The pattern may be printed onto the uncut material or the on the bodysuit during or after construction. The pattern may be printed on onto the bodysuit via processes such as screen printing, embroidery, dying, stenciling, and drawing.

Figure 3B:
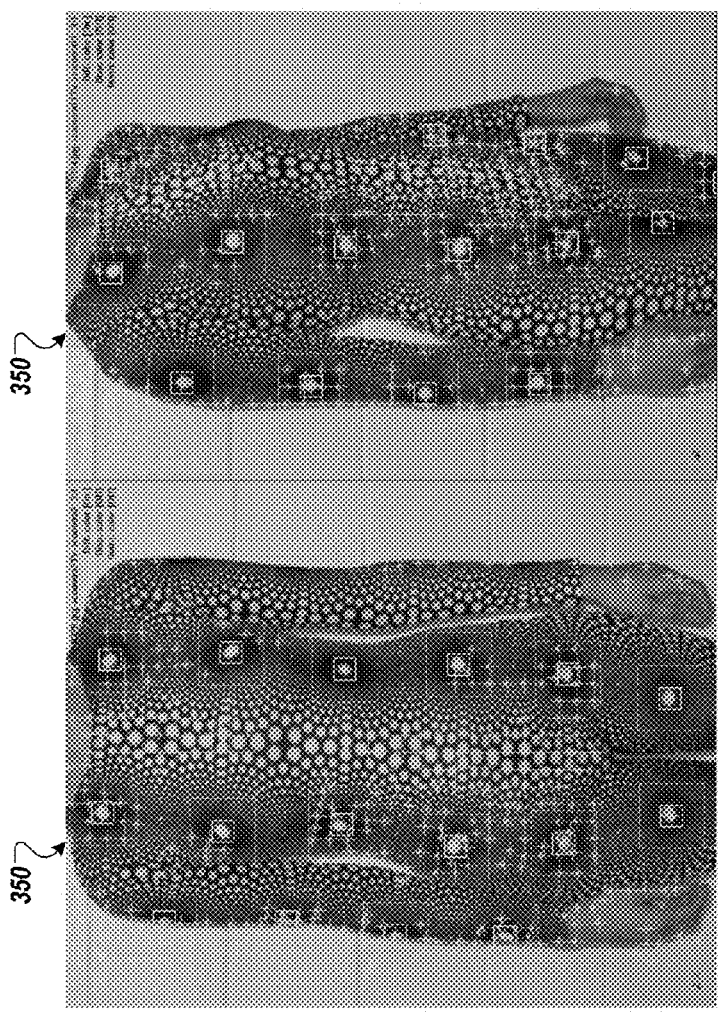
FIG. 3B shows an example motion capture bodysuit with some elements of the suit identified.

FIG. 3B shows an example motion capture bodysuit 350 with some elements of the suit identified. The bodysuit 350 is shown from two angles, for example the angles of two cameras in a motion capture system configured to track the movements of the elements of the scale-independent pattern on the bodysuit 350.

The scale independent pattern on the bodysuit 350 includes white circles of various sizes. A motion capture system may be configured to attempt to identify and track white circles within a defined size range. The identified circles are here superimposed by a green square or cross-shaped target, indicating that many of the largest circle shapes are tracked. That is, each of the green squares/targets corresponds to one or more markers that the system has detected on the bodysuit. If the actor wearing the bodysuit were to move toward the cameras, the resolution of the circles on the bodysuit 350 would increase, and as a result, the motion capture system may then be able to detect and track the other ones of the circles. Accordingly, the system may then generate new instances of green square/targets corresponding to the other detected circles.

Figure 4:
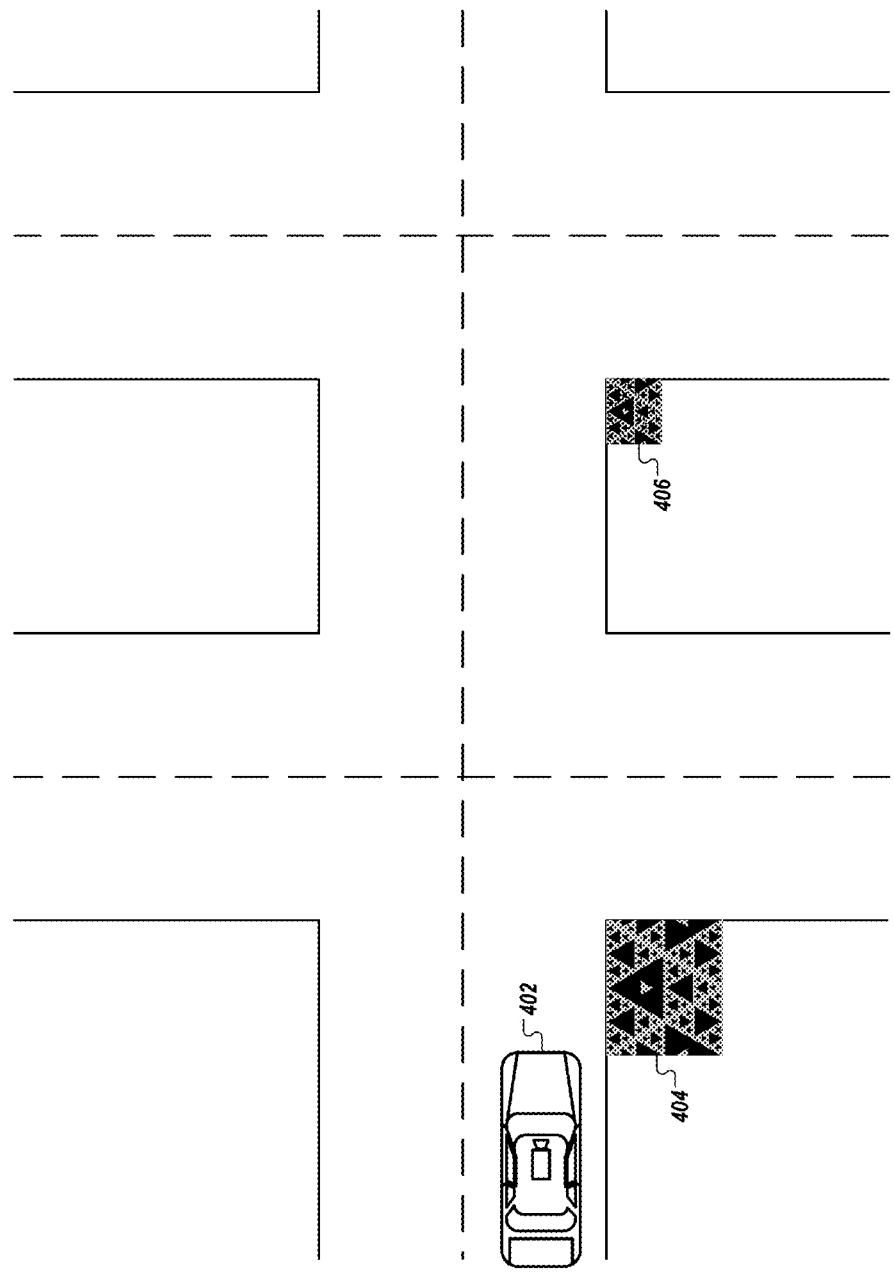
FIG. 4 shows an autonomous automobile on a track with example scale independent waypoints.

FIG. 4 shows an autonomous automobile 402 on a track with example scale independent waypoints 404 and 406. The autonomous automobile 402 is an automobile that is configured or modified to drive with little or no input from a human driver or user and is instead controlled by, for example, a robot. In this example, the scale independent waypoints 404 and 406 have been placed at the corners of a track or roadway to act as navigational aid for a robot or car traveling on the track. The waypoint may be configured in the form of signs or markings on building, and may be fixed at stationary points. The waypoint 406 is here schematically shown at a lower resolution than the waypoint 404 to indicate that the waypoint 406 is currently farther from the autonomous automobile 402. In the actual implementation, however, the waypoints 404 and 406 may be of the same size.

One or more vision sensors on the autonomous automobile 402 can scan for and identify the scale independent waypoints 404 and 406. When one or more waypoints are detected, their locations can be used by the car system to determine the location of the autonomous automobile 402. In the example shown, the waypoints 404 and 406 bear the same pattern and are different distances from the autonomous automobile 402. At the different ranges, different portions of the pattern are trackable by the autonomous automobile 402, allowing the autonomous automobile 402 to track both of the waypoints 404 and 402 at the same time. Similarly, the waypoints 404 and 406 may be recorded by the autonomous automobile 402 with different blur patterns. The focal length of image capture equipment in the autonomous automobile 402 may cause the waypoint 404 to appear without focal blur and the waypoint 406 appear with focal blur. Additionally, if the autonomous automobile 402 is moving, the waypoint 404 may appear to have more motion blur than the waypoint 406, as the waypoint 404 is closer to the autonomous automobile 402.

In some implementations, the locations of waypoints in the track may be based on a rule-set. For example, the waypoints may be specified to be posted before each intersection or right turn. The autonomous automobile 402 may be programmed with the rule-set so that it can determine a course of action when it identifies a waypoint. For example, the autonomous automobile 402 may stop at a point parallel to the scale independent waypoints 404 and 406, scan for crossing traffic, and proceed when the track is clear.

In some other implementations, the scale independent waypoints 404 and 406 may bear different patterns. For example, each intersection of the track may be associated with a different pattern, and when the autonomous automobile 402 encounters one of the scale independent waypoints 404 and 406, the autonomous automobile 402 can determine its own location on the track based on the location of the scale independent waypoints 404 and 406. In some example, the scale independent waypoints 404 and 406 may bear a pattern with different shapes at different scales to provide the autonomous automobile 402 with information to determine the distance to each scale independent waypoints 404 and 406.

Figure 5:
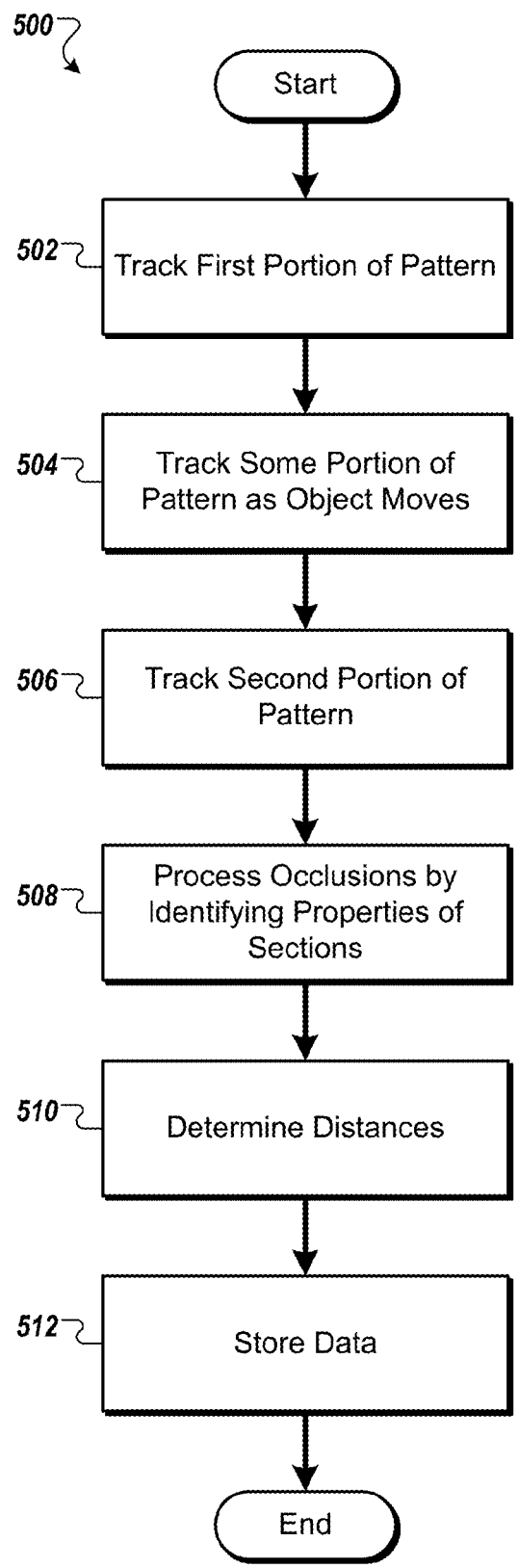
FIG. 5 is a flowchart of an example process for tracking a scale independent pattern.

FIG. 5 is a flowchart of an example process 500 for tracking a scale independent pattern. The process 500 can be performed by a system such as the capture device 104, and for illustrative purposes will be described with reference to the system 100 (FIG. 1). However, other systems may perform the process 500.

A first portion of a pattern is tracked (502). For example, the cameras 106 can record the actor 102 in position 107b at a distance 108b, and the capture device 104 can identify and track some of the shapes of the pattern on the actor 102. The capture device 104 can map the movements of the actor 102, as determined by the motions of the tracked shapes, to a motion model. At the distance 108b, some of the shapes on the actors 102 may at too high or low a resolution for the motion capture software to track, but some of the shapes may appear within the range that the capture device 104 can track. Additionally, the movements of the actor or the focal length of the cameras 106 may blur the images recorded by the cameras 106, reducing the range of resolutions that may be tracked by the capture device 104

Some portion of the pattern is tracked as the object moves (504). For example, as the actor 102 moves from position 107b to position 107a, the resolutions of the shapes of the pattern on the actor 102 change. If the actor 102 moves toward the cameras 106, the resolutions of the shapes of the pattern may increase. At any distance between 108a and 108b, at least some portion of the pattern can be tracked by the capture device 104 and motion information can be determined from the portion that can be trackable.

A second portion of the pattern is tracked (504). For example, the actor 102 can move to the position 107a at a distance 108a from the cameras 106. At position 107a, a second portion of the pattern may be tracked by the capture device 104. For example, smaller triangles in the pattern that were too small to track at a distance 108b may appear larger at position 107a and may be tracked. In some examples, some triangles may be so large that, while they are trackable at the distance 108b, they are trackable at the distance 108a. In other examples, all triangles that are trackable at the distance 108b are also trackable at the distance 108a.

In some implementations, the depth of focus of the cameras 106 may be such that the actor 102 is in focus at the distance 108b and out of focus at 108a, or vice versa. Additionally, the motion of the actor 102 as he moves from distance 108b to 108a may introduce motion blur. To compensate for the blur, the capture device 104 may track larger portions of the pattern than if there was no blur.

Occlusions are processed by identifying properties of sections of the pattern (506). For example, some sections of the pattern on the actor 102 may have different properties. In one implementation, each arm and leg of the bodysuit may have a different background or shape color. If a portion of the bodysuit occludes another part, such as if the actor 102 claps his hands together in front of his chest, the arms of the bodysuit will occlude portions of the torso. The capture device 104 can identify the sections of the bodysuit by the color property, and determine that the arms occlude the torso. In other implementations, properties can change across a pattern continuously instead of discreetly. For example, the background color may be a gradient that changes from one color to another. In some implementation, the shapes of the pattern may be different in different sections. For example, the pattern on the actor's 102 torso may be triangles, and the pattern on the actor's 102 arms may be squares. Other example properties that may be used can include, but are not limited to reflectivity, absorbance, luminescence, and/or the presence or absence of fiducial markers.

Distances are determined (510). For example, the capture system may calculate the distances 108a, 108b, or any other camera-actor distance. For example, the portions of the pattern on the actor 102 at a single scale (e.g. all shapes of a particular size) may have a different property than the other portions. The resolution of those portions may be used to calculate the distance between the cameras 106 and the actor 102. In some implementations, the captured size of the portion (e.g. the number of pixels showing a particular shape) or the captured distance between two parts of the portion (e.g. the number of pixels between two neighboring copies of the particular shape) may be used to measure the resolution of the portion of the pattern.

Data is stored (512). For example, the capture device 104 may store motion vectors, distance calculations, meshes, or tracking cages to a hard disk or removable computer media.

The data can be used later by the same or other systems, for example to drive an animation model.

Although the process 500 was described in terms of a motion capture system, other uses are possible. For example, the process 500 could be used for robotic or autonomous navigation, inventory tracking, machining cell control, data representation, barcode reading, or body-capture based user interfaces (e.g. a video game interface where user inputs are based on body motions or positions).

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer implemented method of machine vision, the method comprising:
   identifying a first portion of a scale independent pattern of geometric shapes on an object positioned in an environment at a first resolution;
   identifying a second portion of the scale independent pattern of geometric shapes on an object positioned in the environment at a second resolution, wherein the second portion of the scale independent pattern cannot be identified at the first resolution;

causing data related to the identifying to be stored to a computer readable medium; and enabling movement of a second object within an environment based on the identifying.

2. The method of claim 1 wherein the method further comprises identifying the pattern at a plurality of resolutions between first resolution and the second resolution.

3. The method of claim 1 wherein the scale independent pattern of geometric shapes comprises a fractal.

4. The method of claim 1 wherein the first and second portions of the scale independent geometric pattern are part of a waypoint and the machine vision process is navigation waypoint tracking.

5. The method of claim 4 wherein a plurality of waypoints are positioned in an environment, each having first and second portions of the scale independent geometric pattern located thereon, wherein the second object is an autonomous robot, and wherein the method further includes enabling the autonomous robot to navigate within the environment based on identifying individual waypoints based on the first and second portions of the scale independent geometric pattern.

6. The method of claim 4 wherein a plurality of waypoints are positioned in an environment, each having first and second portions of the scale independent geometric pattern located thereon, wherein the second object is an autonomous automobile, and wherein the method includes enabling the autonomous automobile to navigate within the environment based on identifying individual waypoints based on the first and second portions of the scale independent pattern.

7. A system for enabling machine vision, the system comprising:

one or more vision sensors configured to scan and identify a scale independent pattern of geometric shapes; and a computer-readable storage device having a computer program stored thereon;

one or more processing devices operable to execute the computer program, receive input from the one or more vision sensors, and perform operations comprising:

identifying a first portion of a scale independent pattern of geometric shapes on an object positioned in an environment at a first resolution;

identifying a second portion of the scale independent pattern of geometric shapes on an object positioned in the environment at a second resolution, wherein the second portion of the scale independent pattern cannot be identified at the first resolution;

causing data related to the identifying to be stored to a computer readable medium; and enabling movement of a second object within an environment based on the identifying.

8. The system of claim 7 wherein the system further comprises identifying the pattern at a plurality of resolutions between first resolution and the second resolution.

9. The system of claim 7 wherein the scale independent pattern of geometric shapes comprises a fractal.

10. The system of claim 7 wherein the first and second portions of the scale independent geometric pattern are part of a waypoint and the machine vision process is navigation waypoint tracking.

11. The system of claim 10 wherein a plurality of waypoints are positioned in an environment, each having first and second portions of the scale independent geometric pattern located thereon, wherein the second object is an autonomous robot, and wherein the system further includes enabling the autonomous robot to navigate within the environment based on identifying individual waypoints based on the first and second portions of the scale independent geometric pattern.

12. The system of claim 10 wherein a plurality of waypoints are positioned in an environment, each having first and second portions of the scale independent geometric pattern located thereon, wherein the second object is an autonomous automobile, and wherein the system includes enabling the autonomous automobile to navigate within the environment based on identifying individual waypoints based on the first and second portions of the scale independent pattern.

13. A non-transitory computer-readable memory comprising instructions that, when executed by a processor, perform a method comprising:

identifying a first portion of a scale independent pattern of geometric shapes on an object positioned in an environment at a first resolution;

identifying a second portion of the scale independent pattern of geometric shapes on an object positioned in the environment at a second resolution, wherein the second portion of the scale independent pattern cannot be identified at the first resolution;

causing data related to the identifying to be stored to a computer readable medium; and enabling movement of a second object within an environment based on the identifying.

14. The non-transitory computer-readable memory of claim 13 wherein the method further comprises identifying the pattern at a plurality of resolutions between first resolution and the second resolution.

15. The non-transitory computer-readable memory of claim 13 wherein the scale independent pattern of geometric shapes comprises a fractal.

16. The non-transitory computer-readable memory of claim 13 wherein the first and second portions of the scale independent geometric pattern are part of a waypoint and the machine vision process is navigation waypoint tracking.

17. The non-transitory computer-readable memory of claim 16 wherein a plurality of waypoints are positioned in an environment, each having first and second portions of the scale independent geometric pattern located thereon, wherein the second object is an autonomous robot, and wherein the method further includes enabling the autonomous robot to navigate within the environment based on identifying individual waypoints based on the first and second portions of the scale independent geometric pattern.

18. The non-transitory computer-readable memory of claim 16 wherein a plurality of waypoints are positioned in an environment, each having first and second portions of the scale independent geometric pattern located thereon, wherein the second object is an autonomous automobile, and wherein the method further includes enabling the autonomous automobile to navigate within the environment based on identifying individual waypoints based on the first and second portions of the scale independent pattern.

* * * * *